United States Patent [19]

Smith et al.

[11] Patent Number: 5,355,480
[45] Date of Patent: Oct. 11, 1994

[54] STORAGE CONTROL METHOD AND APPARATUS FOR AN INTERACTIVE TELEVISION TERMINAL

[75] Inventors: Elizabeth A. Smith, Cumming; Lee R. Johnson, Lawrenceville, both of Ga.

[73] Assignee: Scientific-Atlanta, Inc., Norcross, Ga.

[21] Appl. No.: 960,261

[22] Filed: Oct. 13, 1992

Related U.S. Application Data

[63] Continuation of Ser. No. 342,987, Apr. 20, 1989, abandoned, which is a continuation-in-part of Ser. No. 289,218, Dec. 23, 1988, Pat. No. 4,987,486.

[51] Int. Cl.$^5$ .................................. G06F 15/40
[52] U.S. Cl. ............................ 395/600; 395/425; 364/DIG. 2; 364/919.2; 364/933,9; 364/962; 364/974
[58] Field of Search ............... 364/DIG. 1, DIG. 2; 395/600

[56] References Cited

U.S. PATENT DOCUMENTS

| | | | |
|---|---|---|---|
| 3,539,999 | 11/1970 | Houldin et al. | 340/172.5 |
| 3,757,037 | 9/1973 | Bialek | 178/6.6 |
| 3,819,862 | 6/1974 | Hedges | 179/2 |
| 3,906,457 | 9/1975 | Mattedi et al. | 340/172.5 |
| 4,059,850 | 11/1977 | Van Eck et al. | 364/200 |
| 4,186,438 | 1/1980 | Benson et al. | 364/200 |
| 4,264,924 | 4/1981 | Freeman | 358/86 |
| 4,403,303 | 5/1981 | Howes et al. | 364/900 |
| 4,451,701 | 5/1984 | Bendig | 179/2 |
| 4,455,570 | 6/1984 | Saeki et al. | 358/86 |
| 4,536,791 | 8/1985 | Campbell et al. | 358/122 |
| 4,575,579 | 3/1986 | Simon et al. | 178/4 |
| 4,586,158 | 4/1986 | Brandle | 364/900 |
| 4,613,946 | 9/1986 | Forman | 364/518 |
| 4,758,946 | 7/1988 | Shar et al. | 364/200 |
| 4,791,561 | 12/1988 | Huber | 364/300 |
| 4,816,438 | 1/1990 | Benson et al. | 364/200 |
| 4,963,994 | 10/1990 | Levine | 358/335 |

FOREIGN PATENT DOCUMENTS 0190837 1/1986 European Pat. Off. .

OTHER PUBLICATIONS

Patent Cooperation Treaty International Search Report, 6 pgs. Appln. No. PCT/US 90/02034; Filing Date: Apr. 19, 1990; Date of Completion: Sep. 13, 1990.

"An Interactive Videotex System for Two-Way CATV Networks" by Henrie van den Boom, 6 pp. 397–401.

"High Speed Teletext Standard for Cable Television Systems" by Bradley Martin, 6 pgs., University of California.

Primary Examiner—Gareth D. Shaw
Assistant Examiner—Kakali Chaki
Attorney, Agent, or Firm—Banner, Birch, McKie & Beckett

[57] ABSTRACT

An interactive terminal comprises a processor, a local data store connected to the processor, a character generator responsive to processor control for generating a television signal output to an associated television receiver, a key pad or remote control for inputting information to the processor, and a power supply input. The terminal is coupled, via 2-way RF communications, to a central location designated as the system manager, where the terminal is accessed by polling for monitoring and servicing terminal user requests. The interactive terminal has a local storage capacity for storing a number of character screen commands, accessed from a central data base at the system manager, for use in generating prompting screens displayed on the television receiver. In use, a user may call for a variety of services by operating the input keys of the key pad to cause a prompting screen to be displayed. Screen commands are stored at the terminal according to an assigned priority. The stored screen commands also include pointers which are used by the terminal processor to prefetch screens which will likely follow the current screen in a decision tree structure manner. Thus, screens may be prefetched from the central data base and downloaded for storage at the terminal so that they are available for display if and when called for. If a particular branch of a decision tree is not selected, screens associated with the unselected branch are deleted from terminal memory as needed to make room for new screens. The terminal memory is also controlled so that data is swapped in and out of memory based on its relative priority.

42 Claims, 6 Drawing Sheets

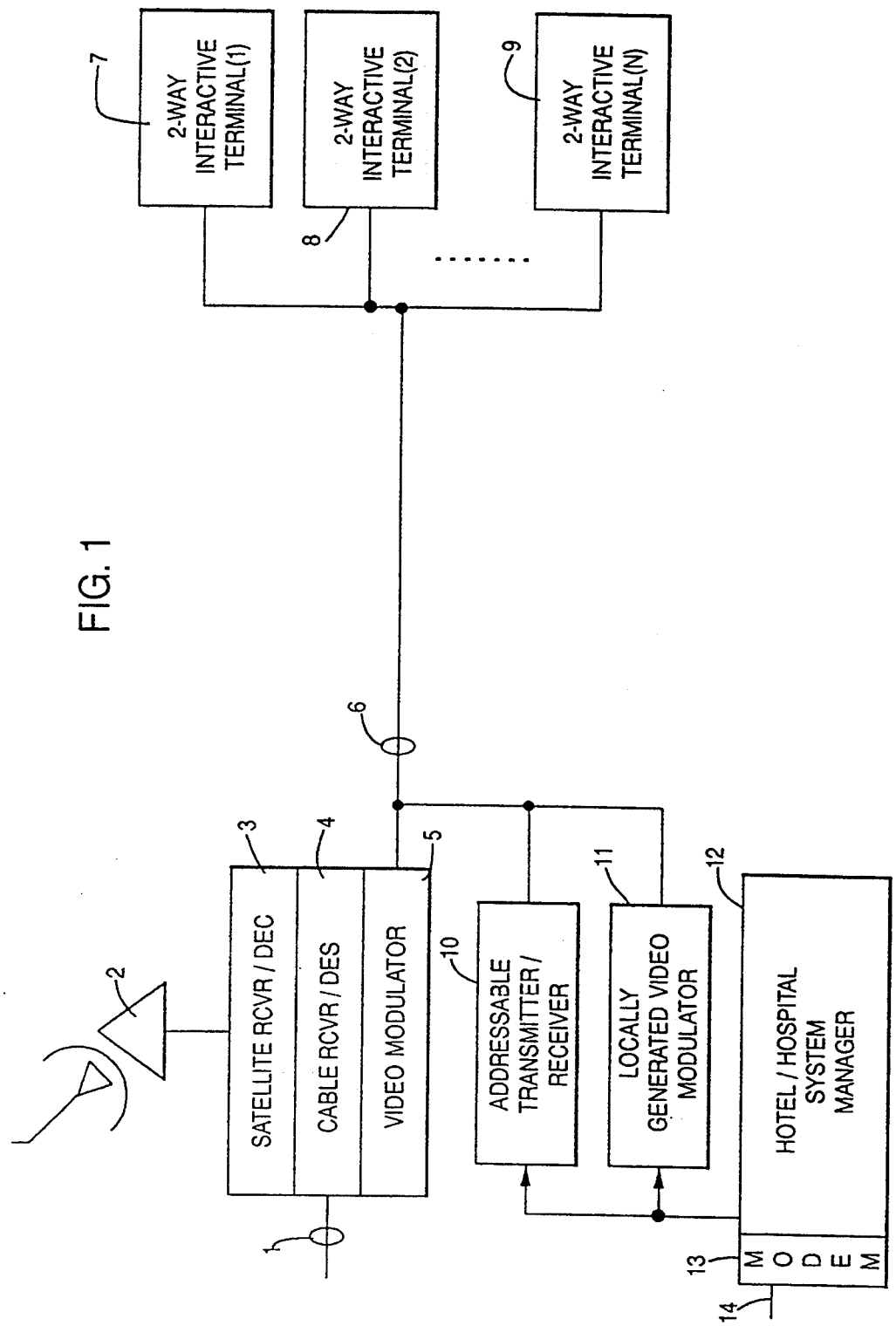

FIG. 3
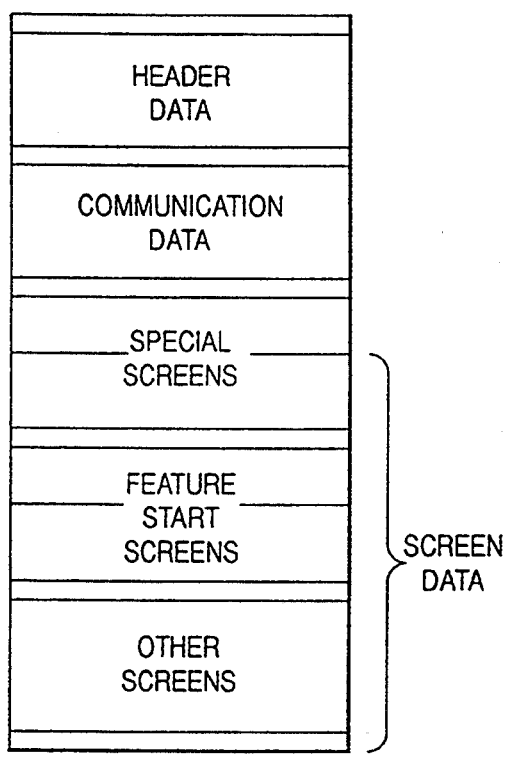
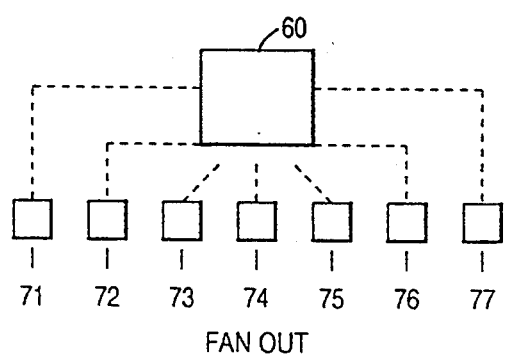
FIG. 7(a)
FAN OUT
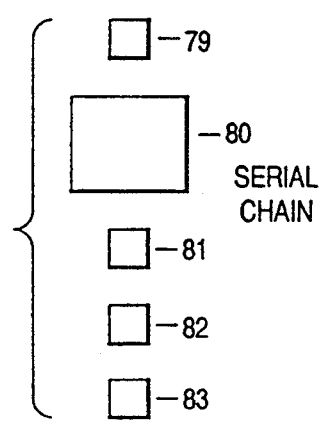
FIG. 7(b)
SERIAL CHAIN

FIG. 4

| SCREEN NUMBER | PRIORITY | CANNIBAL BIT | TYPE | AUDIO / VIDEO CHANNEL | AUDIO | FEATURE NUMBER | TIMEOUT | KEY TEMPLATE | TEXT FIELD | ATTRIBUTE FIELD |
|---|---|---|---|---|---|---|---|---|---|---|

FIG. 5

| KEY ACTION | GO TO SCREEN |
|---|---|

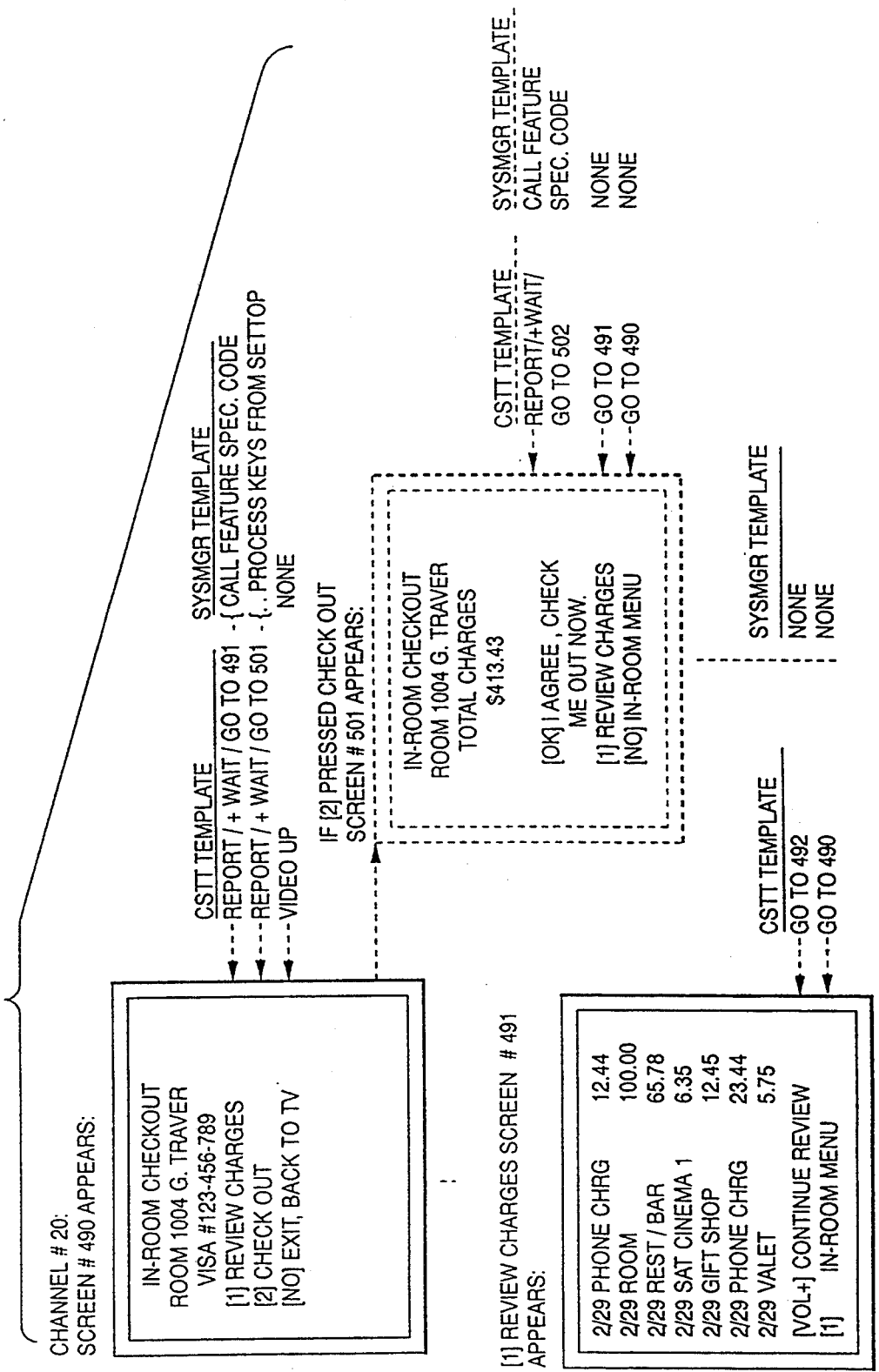

STORAGE CONTROL METHOD AND APPARATUS FOR AN INTERACTIVE TELEVISION TERMINAL

This application is a continuation of application Ser. No. 07/342,987, filed Apr. 20, 1992, now abandoned. which application is a continuation-in-part of application Ser. No. 289,218, filed Dec. 23, 1988, and now U.S. Pat. No. 4,987,989, entitled "Automatic Interactive Television Terminal Configuration" and is related to U.S. application Ser. No. 07/340,642, now U.S. Pat. No. 5,077,607, entitled "Cable Television Transaction Terminal"; Ser. No. 07/340,731, now U.S. Pat. No. 5,001,554, entitled "Terminal Authorization Method"; Ser. No. 07/340,659, now U.S. Pat. No. 5,035,883, entitled "Terminal Polling Method"; Ser. No. 340,967, now U.S. Pat. No. 4,991,011, entitled "Interactive Television Terminal with Programmable Background Audio or Video"; and Ser. No. 07/340,660, now U.S. Pat. No. 4,994,908, entitled "Interactive Room Status/Time Information System", filed concurrently herewith.

TECHNICAL FIELD

This invention relates generally to two-way interactive cable television systems in which entertainment services, information and data signals are provided over cable facilities from a system manager location to a user location, and more particularly to a method and apparatus for controlling the storage of data in local storage at the user location.

BACKGROUND OF THE INVENTION

Two-way interactive cable television systems are known for transmitting entertainment, information and data signals over a cable facility toward a plurality of users. Data may be transmitted and addressed to a particular subscriber over a separate data channel or over a so-called "n-band" data channel. In a downstream direction. addressed control data may represent services authorized to a particular terminal or control commands to that terminal. In an upstream direction from a terminal to the service provider or system manager location, control data may represent selections made by a user in response to a polling request or at the time of user selection.

In a hotel environment, the system manager delivers video signals, e.g., television programming, to user terminals located, for example, in various hotel rooms over cable lines, and the system manager also transmits digital messages To receivers at each room location. Similarly, information and data generated at each room are transmitted upstream to the system manager via the cable.

It is known in the prior art to provide an interactive terminal at a user location including a local processor for controlling access to a host computer located at the system manager location and a local data store connected to the local processor. Such terminals also normally consist of a display for displaying messages to the user or details of the transaction being conducted, and a keyboard or remote key pad comprising a number of keys by which the user can enter data and initiate functions.

Typically, a central data storage is provided at the system manager location for storing a complete data base, and a smaller subset of that data base is maintained in the local store at the user terminal. Because faster response times can be achieved if a requested transaction can be completed without the need for repeatedly accessing the central data base, configuration of the local store becomes an important design consideration. Prior methods of local storage management have been based upon last use or recency of use, and systems are also known in which those items in the data base most frequently requested by the user terminals are retained in the local store. These methods have not, however, been entirely satisfactory, and have not uniformly achieved the desired reduction in response time. Accordingly, there is a need for a more efficient technique for choosing data items to be stored in a local storage of an interactive terminal system.

SUMMARY OF THE INVENTION

It is an object of the present invention to provide an improved method of local storage management for an interactive terminal which ensures faster response times and which reduces the need for repeatedly accessing the central data base.

It is another object of the present invention to provide a method of local storage management for an interactive terminal which updates the local store in accordance with the relative priority of data entries.

It is still another object of the present invention to provide a method of local storage management which updates the local store in accordance with the system service requested by the user.

An interactive terminal, according to the present invention, comprises a processor, a local data store connected to the processor, a character generator responsive to processor control for generating a television signal output to an associated television receiver, a key pad or remote control for inputting information to the processor, and a power supply input.

In a hotel environment, the interactive terminals are located in individual hotel rooms and are coupled, via 2-way RF communications, to a central hotel location, designated as the system manager, where the terminals are accessed by polling for monitoring and servicing the guests' requests. The local storage capacity of the interactive terminal is provided for storing data and a number of character screen commands, accessed from a central data base at the system manager, for use in generating prompting screens displayed on the television receiver. Thus, in use, a hotel guest may call for a variety of services, e.g., pay TV programs, room service and the like by operating the input keys of the key pad to cause a prompting screen to be displayed on the television receiver.

According to the invention, character screen commands are stored at the terminal according to an assigned priority. The stored screen commands also include pointers which are used by the terminal processor to prefeteh other screens which follow the current screen in a decision tree structure manner. These screens are downloaded from the system manager for storage at the terminal so that they are available for display if and when called for. In operation, if a particular branch of a decision tree is not selected by the user, screens associated with that branch are deleted from terminal memory as needed to make room for new screens. The terminal memory is also controlled so that character screen commands are swapped in and out of memory based on their relative priority.

BRIEF DESCRIPTION OF THE DRAWINGS

FIG. 1 is a block schematic diagram of an interactive entertainment system in accordance with the present invention applied in a hotel or hospital system environment comprising automatically configurable two-way interactive terminals.

FIG. 3 is a schematic diagram showing the data types stored within the screen data area of RAM 217 of FIG. 2.

FIG. 4 is a schematic diagram showing the data structure of character screen commands stored in RAM 217 of FIG. 2.

FIG. 5 is a schematic diagram showing the data structure of the key template shown in FIG. 4.

FIG. 6 shows a number of exemplary display screens and associated key templates for the in-room checkout feature.

FIG. 7a is a block diagram showing the tree structure of a fan-out type feature.

FIG. 7b is a block diagram showing the tree structure of a serial chain type feature.

DETAILED DESCRIPTION OF THE PREFERRED EMBODIMENT

Figure 1A:
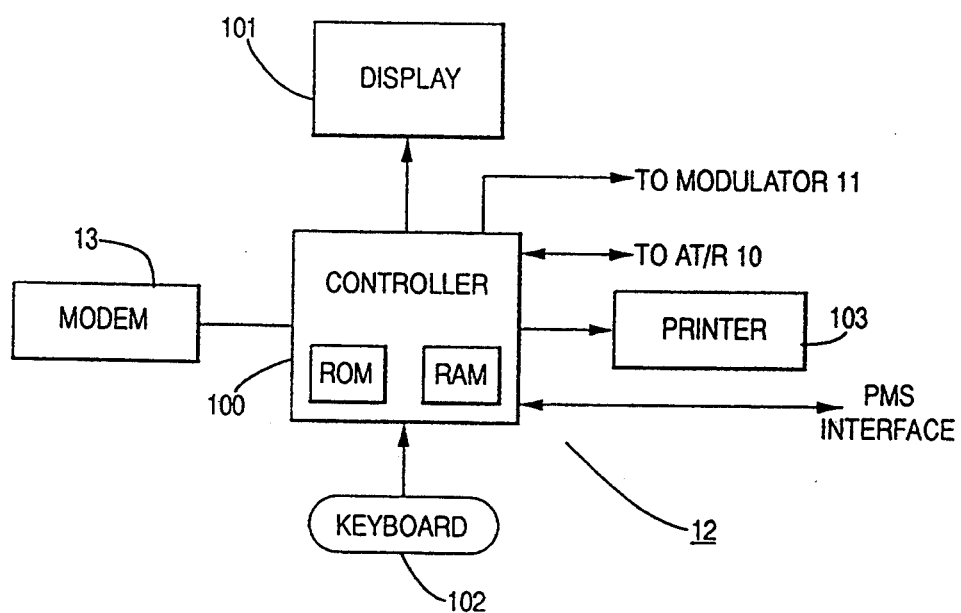
FIG. 1a is a block schematic diagram of system manager 12 of FIG. 1.

Referring to FIG. 1, there is shown a block schematic diagram of an interactive entertainment system in accordance with the present invention. The depicted embodiment relates to its application in a hotel or hospital system environment, however, the present invention is not so limited, and may be applied in any two-way interactive entertainment system such as a cable or satellite television entertainment system involving a distribution network comprising trunk lines and feeder cables of optical or coaxial cable. For example, satellite receiver and decoder 3, cable receiver and descrambler 4, video modulator 5, addressable transmitter receiver 10, locally generated video modulator 11, and system manager 12 may all be located at the location of a cable television system head end. In this example, coaxial cable or optical fiber link 6 can connect the cable television head end to two-way interactive terminals 7, 8 or 9 of the entertainment system located at individual subscriber premises.

On the other hand, the embodiment of FIG. 1 is especially exemplary of the application of the present invention in a hotel or hospital entertainment system. Transmission link 6, then, may simply comprise a coaxial or optical fiber cable link between an entertainment control center and a plurality of terminals, for example, terminals 7, 8 or 9 located in rooms of the facility.

In particular, at the system control center, a satellite signal may be received at satellite antenna 2 and then received and decoded at satellite receiver decoder 3 for distribution via modulator 5 over a distribution cable 6 to the interactive terminals 7, 8 or 9 of the present invention. Additionally, a band of cable television channels received over cable facilities 1 are received and, if necessary, descrambled at cable receiver/descrambler 4. The descrambled video signals are then modulated at modulator 5 for distribution over facilities 6 to interactive terminals 7, 8 or 9. If desired, an optional scrambler may be provided for scrambling premium channel transmissions to interactive terminals 7, 8, or 9. Of course, terminal 7, 8 or 9, then, would comprise descrambler circuitry capable of descrambling the scrambled premium channel transmissions. Such circuitry is not shown in either FIG. 1 or 2 but would be preferable in a system involving distribution of signals to remote subscriber locations.

According to the exemplary embodiment of FIG. 1, the hotel or hospital location may be connected to other hotels or hospitals via data link 14. Over data link 4, data may be received via modem 13 at system manager 12. In this manner, the hotel or hospital system manager may maintain current status of all features and all interactive terminals of an entertainment system comprising a plurality of hotels. For example, entertainment schedules may be distributed over the data transmission link from a network control center where the entertainment schedule is composed. System manager 12 comprises a data processing unit and appropriate memory for storing status and features associated with all terminals in the system. System manager 12 also controls the generation of video channels at modulator 11, if necessary, for transmission over facility 6 to the two-way interactive terminals 7, 8 or 9. In particular modulator comprises the capability to generate signals or actuating the display o character screens at terminal locations responsive to the control of the system manager 12 in the event for example that terminals are unable to generate the character screens themselves.

The generation of complete screens of characters for transmission to a terminal according to the present invention for display is no required because he terminal (FIG. 2) comprises its own character generator 204. Consequently, locally generated video modulator 11 is optional. Instead, system manager 12 generates commands to generate screens, and not the screens themselves, for transmission via addressable transmitter 10 to an interactive terminal according to the present invention. In a "hybrid" system comprising terminals having no character generator and terminals according to the present invention, locally generated video modulator 1 would be necessary. The screens generated either at the terminal or by way of moderator 11, for example, may relate to the provision of information to guests or patients about hotel or hospital services, respectively.

Also according to FIG. 1, system manager 12 controls an addressable transmitter/receiver 10 for transmitting addressed communications which are uniquely addressed to terminals 7, 8 or 9 and receiving communications at random times or in response to polling requests of terminals. The addressable transmitter 10 according to FIG. 1 may transmit addressed information on a separate data carrier, for example, at 108 megahertz and receive information transmitted in a so-called upstream direction from the terminals on another separate data channel at 25 megahertz. In an alternative embodiment, all downstream communications may be transmitted in band or within a particular television channel transmission, for example, within the horizontal or vertical intervals of transmitted video signals. Consequently, the system manager 12 accomplishes in band signaling by controlling data input into the video signals transmitted via either modulators 5 or 11 (not shown). A separate data carrier for each direction of transmission may be preferred due to the increased data carrying capacity. For upstream transmission, a telephone line or spread spectrum transmission may be employed as an alternative to a separate data channel.

Referring to FIG. 1a, system manager 12 particularly comprises a processor 100, an associated memory, ROM, for storing control algorithms, a read/write memory, RAM, for storing a plurality of character screens, a display screen 101 and a keyboard 102 for screen design and modification. An optional printer 103 is also provided for printing out room checkout bills in a similar manner as would occur at a hotel front desk during checkout.

Besides specifically addressed data communications with the interactive terminals 7, 8 or 9, the system manager may also address communications globally to all interactive terminals which communications may or may not require a terminal to respond. Such global communications, for example, may be addressed to a global address representing all terminals in the particular hotel system or to a group address representing a group of terminals within the system having a commonality of interest.

Figure 2:
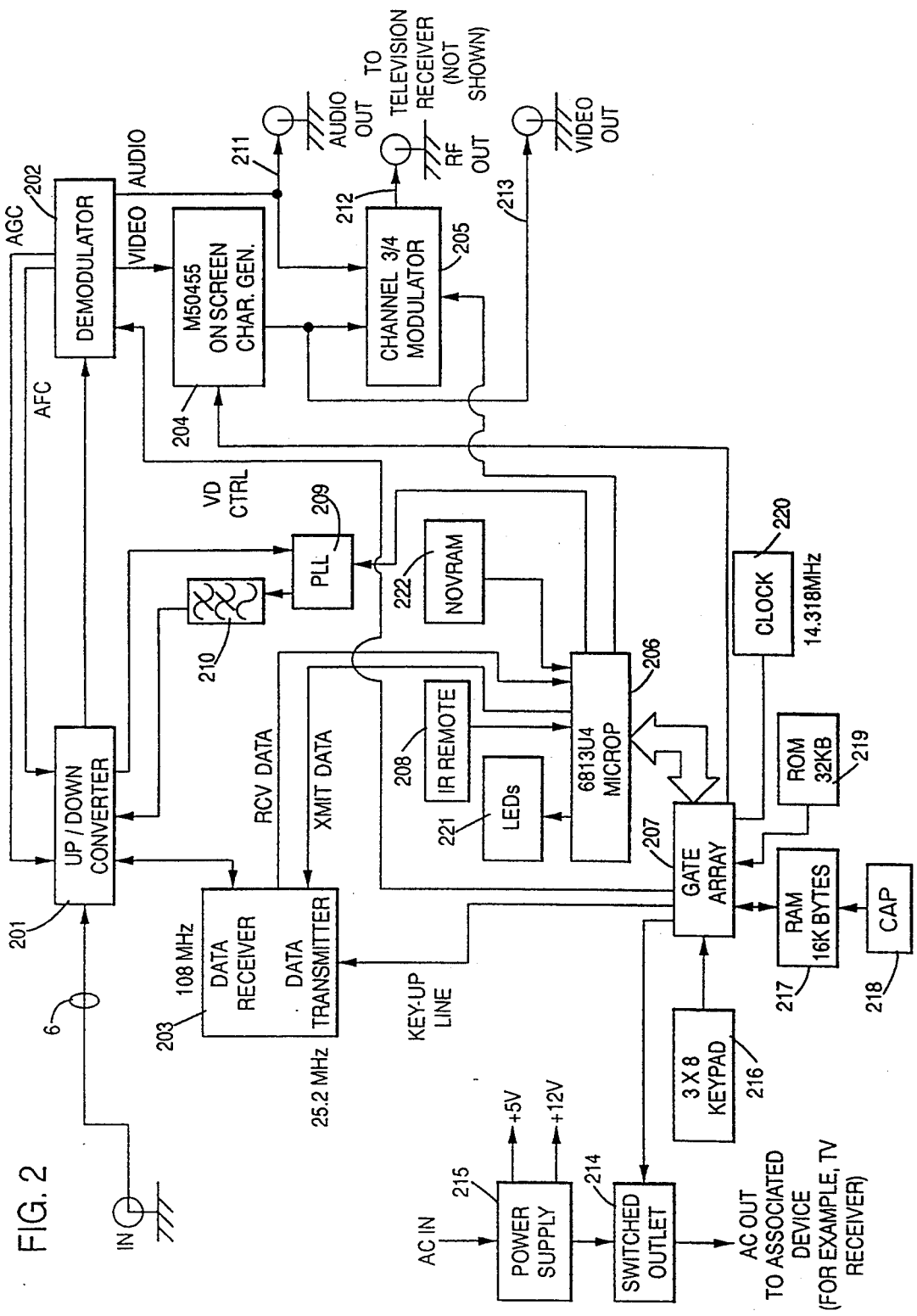
FIG. 2 is a block schematic diagram of a two-way interactive terminal according to the present invention comprising a microprocessor, a memory, a character generator, a key pad and a television signal output to an associated television receiver.

Referring to FIG. 2, there is shown a two-way interactive terminal according to the present invention. The terminal is coupled via facility 6 to video modulator 5, addressable transmitter/receiver 10, and locally generated video modulator 11, if provided, as shown in FIG. 1.

In particular, a two-way interactive terminal according to the present invention comprises an up/down converter 201 for converting channels received over the facility 6 for display at an associated television receiver (not shown) or for transmitting data modulated to 25 megahertz by data transmitter 203 for transmission over facility 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on screen character generator 204 to channel 3/4 modulator 205. In this manner, on screen character generation may appear superimposed upon an incoming video signal or displayed in the form of a teletext screen, for example, text on a plain colored background. Also at demodulator 202 the baseband audio channel is transmitted to audio output 211 or via channel modulator 205 to the television receiver at radio frequency. In addition, a baseband video output 213 may be provided from on screen character generator 204 at video output jack 213.

The interactive terminal of the present invention further comprises a processor 206 for controlling data transmission and reception at data receiver/transmitter 203. Processor 206 also controls character generation at character generator 204 via gate array 207. Also via gate array 207, the processor 206 controls a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of the up/down converter 201.

Power is supplied via an alternating current input to power supply 215 which provides, for example, a plus 5 volt and a plus 12 volt DC input to various components of the terminal requiring such power. Furthermore, the alternating current power input to power supply 215 may be provided via a controlled switched outlet 214 to an associated device such as the television receiver associated with the terminal. The state of the switched outlet 214 is controlled via gate array 207 by processor 206. For example, the switched outlet 214 may continuously provide power to its associated device or provide power only when an "on" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided down by gate array 207 for operation of the microprocessor 206 which may be a Motorola MC 6803U4 or for clocking other processes of the terminal. The on screen character generator 204, for example, may be a Mitsubishi M50455 component. RAM 217 may comprise 16 kilobytes of memory and ROM 219 may comprise 32 kilobytes of memory.

Referring now to FIGS. 2–8, the method for controlling storage of screen data in RAM 217 of the interactive terminal will now be described. Referring first to FIGS. 2 and 3, in the preferred embodiment, RAM 217 comprises a screen data area which is divided into a plurality of data blocks. Six data blocks are shown in FIG. 3, however, in the preferred embodiment, RAM 217 is divided into forty seven (47) such blocks. Each data block is comprised of 292 characters, and may contain any one of three types of data, i.e., header data, communications data and screen data. Data in each data block is uniquely identified by a screen number, which is stored at the beginning of the data block, and this screen number also identifies the data "type". In the preferred embodiment, header data have a screen number of 127, screen data have screen numbers in the range of 128–1023, and communications data have screen numbers over 1023.

A Priority List is also stored in RAM 217 and consists of a plurality of pointers to the RAM locations at which the data blocks are stored. These pointers are arranged in order based on the relative priority of data stored within the screen data area, and the Priority List is updated whenever the contents of the screen area are changed. In the preferred embodiment, the Priority List contains forty seven entities which indicate, in priority order, the locations in RAM 217 at which data blocks are stored. Once a data block is stored in RAM 217, its location is never altered, but the data block may be updated with new information or replaced entirely, as will be explained.

Referring again to FIG. 3, each of the data types stored in RAM 217 is assigned a relative priority which is reflected in the organization of the Priority List. Header data is of the highest priority. Next is communications data followed by screen data.

Screen data may be any one of three types—"Special", "Feature Start" and "Other", and is further prioritized according to "type". Screen data is also prioritized within each type according to an assigned priority number in the range from 0 to 7, with 0 being the highest priority and 7 being the lowest priority.

A Special screen is of higher priority than either of the other two screen types, and follows communications data in the priority order. Special screens include, for example, a screen associated with "Power Up", a "Stand By" screen, and various other screens which are critical to the operation of the user terminal.

A Feature Start screen is next in the priority order. The Feature Start screen is the first screen of each feature, e.g., room service, in-room checkout, to be displayed to the user when the feature is selected. A channel map stored in RAM 217 correlates key pad entered channel numbers with either an EIA channel frequency to which the television receiver is to be tuned or with a unique screen number. The channel map thus correlates each of the Feature Start screens with a predetermined user entered channel number so that the Feature Start screen of a particular feature is displayed whenever the user enters the predetermined channel number via key pad 217 (FIG. 2). For example, in FIG. 6, channel 20, entered via Key pad 217, is associated with Feature Start screen 490 of the in-room check-out feature. Other channel keyboard entries activate the terminal to tune to an EIA (Electronic Industries Association) channel frequency for receiving a color television signal.

The third screen type is "Other", and "Other" screens rank last in the priority order. These screens are, thus, the first to be analyzed for possible replacement to make room for other screens of higher priority or associated with the feature currently being viewed by the user, as will be explained. Once the "Other" screen area is exhausted, i.e., when no "Other" screen remain in memory which can be removed to make room for incoming screens, the other data types, i.e., Feature Start screens, Special screens, communications data, and header data, are also analyzed in reverse priority order, for possible deletion.

Focusing more specifically on the screen data, the data structure of the character screen commands stored in RAM 217 is shown in FIG. 4. Briefly, as shown in the figure, the screen data consist of a screen number in the range of 128-1023 which is used, as explained above, to uniquely identify the particular screen. Also associated with each screen is a priority number in the range from 0-7, with 0 being the highest priority and 7 being the lowest priority; a cannibal bit, which aids in swapping screen commands in and out of memory, as will be explained; a type field which indicates the screen type, i.e., Special, Feature Start, or Other; a channel number indicating the channel of any background video or audio associated with the screen; an audio field for indicating whether background audio is being used; a feature number field for identifying the feature scenario, i.e., room service, in-room checkout, etc., of which the screen is a part; a time out field for specifying the maximum viewing time of the screen; a key template map for associating a particular key of the key pad with a particular operation to be performed by processor 206; a text field which contains the actual text to be outputted on the television receiver; and an attribute field for defining the screen display characteristics, e.g., the color and intensity of the background, the size of the characters, the character blink rate and the like.

The key template structure is shown in FIG. 5, and specifies for a particular key of the key pad the action to be taken, e.g., prefetch a screen, and/or the screen or channel, i.e., the go-to screen, to be displayed or tuned, respectively at the user terminal when the key is depressed. In the preferred embodiment, key pad 216 is a hand-held battery operated unit and comprises a total of 18 keys which may be programmably defined for each display screen to cause a particular action to be performed and/or to cause a go-to screen to be displayed. The effect of the go-to screen of the key template is to create a decision tree or hierarchical screen structure, in which each character screen command contains one or more pointers from which one or more other screens may be accessed.

An example of the key template is shown in FIG. 6 for the in-room checkout feature. As shown in the figure, when the checkout feature is initiated by entering channel 20 on key pad 217, screen 490, which is the Feature Start screen, appears. Screen 490 includes a number of instructions which direct the user to depress the "1" key of key pad 216 to review charges; the "2" key to check out; and the "No" key to exit the feature. A key template is also associated with screen 490, and correlates each of keys 1, 2 and "No", i.e., the expected user responses, with particular actions. Thus, in the example, key 1 causes screen 491 to be displayed; key 2 causes screen 501 to be displayed; and "No" causes the video to be brought up.

In addition to directing action at the user terminal, a key template is also provided, as shown in FIG. 6, to direct certain processing at the system manager location in accordance with the user depressed key. Thus, in the example, depression of key 1 in screen 490 causes the system manager to process the user request and to transfer room charges to the user terminal for display on screen 491. Depression of key 2 causes the system manager to process the total charges for the room, which are displayed on screen 501 and depression of key 3 causes no action at the system manager.

Key templates for the user terminal and system manager are similarly associated with each of the expected key responses of screens 491 and 501, as shown in FIG. 6.

There are two basic types of features and, thus, two different types of decision tree structures shown in FIGS. 7a and 7b. In the "fan-out" type feature (FIG. 7a), the key templates, associated with the screens or the feature, direct the flow of screens so that one of a number of screens located one level below the current screen in the tree structure is displayed responsive to user selection. Once a screen associated with a particular branch of the tree is selected, other screens associated with unselected branches will not be accessed and can, therefore, be considered for deletion, as will be explained. Thus, for example, as shown in FIG. 7a, a user viewing screen 60 may directly access any one of screens 71-77, however, once a particular screen, for example, screen 71, is selected, none of screen 72-77 will thereafter be used. Screens 72-77 can, therefore, be replaced, as needed, by other screens, for example, screens (not shown) following screen 71 in the tree structure, which are likely to be requested by the user.

In contrast to the fan-out feature, in the serial chain type feature (FIG. 7b), the key templates of the associated screens direct the flow of screens so that the user either sequentially progresses from one screen to the next in the chain or skips back and forth along the chain. The in-room checkout feature shown in FIG. 6 is an example of a serial chain type feature.

Besides the key template, a cannibal bit, shown in FIG. 4, is also associated with each screen and is used in controlling the storage of screen data in RAM 217. The cannibal bit has a value of either 0 or 1. The normal state of the cannibal bit is 1, but the cannibal bit is configured as 0 in some screen commands to ensure that the screen is retained in memory. This is particularly useful in dealing with features of the serial chain type. As will be explained, when it is desired to store a screen command in RAM 217 and the screen data area is full, processor 206 will first try to remove screens of type "Other" which belong to a feature other than the feature currently selected. However, if only screens of the current feature exist in memory, processor 206 will scan the list of "go-to" screens for the screen currently being viewed and will delete any screen that is not a direct "go-to." This has the effect of deleting screens associated with unselected branches of the decision tree and is effective in fan-out type features to remove unneeded screens. If the current feature is a serial chain type feature, it is desirable to maintain all or most of the screens of the feature in terminal memory. But because many of these screens are not directly accessible, i.e., will not be "go-to's" of other screens, some screens may be deleted. To avoid this situation, the cannibal bit is configured as "0", which signals processor 206, as will be explained, to retain screens of the same feature in terminal memory without regard to the direct "go-to's."

As will be easily understood, the speed at which the system responds to a user request will largely depend upon whether a particular screen is stored locally or whether there is a need to access the central data base at the system manager location. Storage of all screens locally is impractical because this would require too much local storage. However, access is significantly improved by appropriately configuring the local store so that at any given time, the screens most likely to be requested are available in the terminal memory ready for display.

As explained above, when a user desires to activate a particular feature, e.g., in-room checkout, he first enters a predetermined channel number via the terminal keyboard associated with the feature in the channel map. This then causes the first screen of the selected feature to be displayed on the television receiver. The user may then follow the instructions on the screen to proceed through a sequence of screens associated with the selected feature.

In operation, whenever a user initiates a feature or requests a particular service by depressing a key of the key pad, processor 206 first determines whether the requested screen, i.e., either the Feature Start screen or the "go to" screen associated with the depressed key, is present in RAM 217. If it is, then the screen is accessed for display. If the screen is not present in RAM 217, processor 206 issues a screen request to the system manager which responds by issuing an "Add screen" command to processor 206 for the requested screen.

Aside from requesting a screen from the system manager when the processor determines that a screen requested by a user does not currently reside in memory, processor 206 may also prefetch screens into memory prior to their actual use. This prefetch function is tied to user viewing so that when a user views a screen, screens directly accessible by it, as defined by key template go-to's, and not already stored in memory, will be requested. It is also desirable once a user request has been completely serviced and the user is no longer waiting for a screen, e.g., because he is watching television or because he has left the room, to reconfigure terminal memory to an initialized state. Processor 206 will, thus, check a Special screen list maintained in RAM 217 to determine whether there are Special screens which are not already stored in memory, and if there are, these screens will be requested. The channel map will also be searched to identify the screen numbers of all Feature Start screens, a comparison will be made with those screens existent in terminal memory, and any Feature Start screens not present in memory will also be requested.

The basic mechanism for adding screens to RAM 217 is through the "Add screen" command and its companion "Conditional add screen" command. The "Add screen" command is issued by the system manager to processor 206 responsive to a screen request by the user terminal or when the system manager has a new screen to add to the configuration. The "Conditional add" is issued when the system manager wishes to address a screen globally to all of the interactive terminals in the system, and may also be used to address a screen to a particular terminal.

In operation, when the "Add screen" command is issued, processor 206 determines whether vacant space is available in RAM 217 for storing the incoming screen. If space is available, the new screen is stored in the first empty location, and the Priority List is updated so that the memory address of the new screen is appropriately positioned in the list in accordance with the relative priority of the screen. Otherwise, if the RAM is full, it is necessary to remove screen data from RAM 217, and the algorithm described below is used for this purpose.

In general, the removal method will depend upon the current screen i.e., the screen currently being displayed, and the feature with which it is associated. Thus, all "Other" screens, beginning with the screen having the lowest priority as reflected by the Priority List, are first analyzed for possible deletion by checking whether a particular candidate screen is associated with the current feature. Once a screen is found which is not part of the current feature scenario, that screen is replaced by the new screen. If the user is currently watching television, i.e., is not currently requesting any system service, there is no current feature, so that processor 206 will replace the first "Other" screen in the Priority List, i.e., the "Other" screen with the lowest priority, with the new screen.

If the user is currently viewing a screen and all of the "Other" screens in RAM 217 are associated with the current feature, processor 206 examines the cannibal bit of the incoming screen. If the cannibal bit is 1, processor 206 searches the "Other" screens, again beginning with the screen having the lowest priority, to locate screens not directly accessible from the current screen, i.e., screens that are not direct "go-to's" of the current screen. If a non-go-to screen is located, that screen is replaced by the incoming screen.

If all of the "Other" screens are "go-to" screens of the current screen, or if the cannibal bit is 0, processor 206 will then search the "Feature Start" screens and will choose the screen lowest in priority for removal, except that processor 206 will not remove any screen with a 0 priority and also will not remove the "Feature start" screen of the current feature.

If no "Feature start" screen is found which can be removed, a similar search is made of the Special screens, and the Special screen having the lowest priority will be removed. Again, no screens of 0 priority will be removed.

If no suitable screen can be found for removal, another search is performed depending upon whether the incoming screen was requested by the user terminal. This will generally mean that the screen is essential for continued operation. Thus, if the new screen is the result of a screen request, processor 206 will replace the lowest priority screen in memory, disregarding screens with a 0 priority, with the new screen.

The other mechanism for adding screens to RAM 217 is the "Conditional add screen" command which allows the system manager to address a screen globally to all of the interactive terminals in the system or to a particular terminal. The add command is "conditional" in that each terminal determines whether or not it will accept the new screen and, if the screen is accepted, will make room for the screen in accordance with the algorithm described above.

In determining whether a particular screen will be accepted, processor 206 first determines whether the screen corresponds to. i.e., has a same screen number as, a screen currently residing in memory. If it does, then the old screen is replaced with the new screen data.

If the user is watching television, i.e., is not requesting a system service, at the time the "Conditional add" command is issued, processor 206 will also accept and store all "Feature start" screens and all "Special" screens. This ensures that those screens critical to system operation as well as those screens likely to be needed and requested first are available for immediate display.

If, on the other hand, the user is viewing a screen at the time the "Conditional add" command is issued, the criteria for accepting the incoming screen are different. In particular, if the terminal is currently waiting for this particular screen, the screen will be accepted. Otherwise, "Special" screens and "Feature start" screens with a priority of 0 will be accepted, and "Other" screens will be accepted only if the new screen has the same feature number as the screen currently being viewed and is either a direct "go-to" of the current screen or has a cannibal bit of 0.

This invention has been described in detail in connection with the preferred embodiment. However, it will be easily understood by those skilled in the art that other variations and modifications can be made within the scope of the invention as defined by the appended claims.

What is claimed is:

1. A two-way interactive system comprising:
a host data processor;
a central data store controlled by the host data processor for storing a central data base, said central data base comprising a plurality of data items, each of said data items having a relative priority preassigned within said central data base; and
at least one local terminal subsystem connectable to the host data processor for accessing data items stored in the central data base, each of said at least one local terminal subsystem comprising:
a local processor for controlling access to the host data processor;
memory means controlled by the local processor and comprising a first memory area for storing data items accessed from the central data base;
locating means, operable when the first memory area has no vacant space for storing a newly accessed data item, for locating a data item in said first memory area for deletion according to criteria relating to the data items which includes locating one data item wherein the preassigned relative priority of the located data item is lower than the preassigned relative priority of at least one of the other data items stored in the first memory area, the criteria further including tie-breaking criteria to select one data item when more than one data item is located having preassigned relative priorities lower than the preassigned relative priority of the at least one of the other data items; and
deleting means responsive to said locating means for deleting the data item located by the locating means to create space in the first memory area for the newly accessed data item.

2. The system of claim 1 wherein said memory means further comprises a second memory area for storing a plurality of directory entries, each directory entry corresponding to one of said data items stored in the first memory area and specifying a memory address in said first memory area for the corresponding data item, the directory entries being stored as a priority list in said second memory area in a sorted order according to the relative priority of the data items in the first memory area.

3. The system of claim 2 wherein each of said at least one local terminal subsystem further comprises sorting means for updating and sorting said directory entries whenever the contents of the first memory area are changed.

4. The system of claim 2 wherein said locating means locates a data item to be deleted by accessing said second memory area.

5. The system of claim 1 wherein each of said at least one local terminal subsystem further comprises a keyboard having a plurality of keys for inputting information to the local processor.

6. The system of claim 5 wherein the system is characterized by a plurality of system features and said local processor separately activates a system feature in response to actuation of a predetermined key of the keyboard.

7. The system of claim 1, wherein the preassigned relative priority of the newly accessed data item is lower than the preassigned relative priority of one of the other data items.

8. A two-way interactive system characterized by a plurality of system features, the system comprising:
a host data processor;
a central data store controlled by the host data processor for storing a central data base, said central data base comprising a plurality of data items, each of said data items having a relative priority preassigned within said central data base; and
at least one local terminal subsystem connectable to the host data processor for accessing data items stored in the central data base, each of said at least one local terminal subsystem comprising:
a local processor for controlling access to the host data processor;
a keyboard having a plurality of keys for inputting information to the local processor, the local processor activating a system feature of the plurality of system features in response to actuation of a predetermined key of the keyboard;

a character screen generator capable of generating a plurality of character display screens;

memory means controlled by the local processor and comprising a first memory area for storing data items accessed from the central data base, the data items stored in the first memory area including a plurality of character screen commands, said character screen generator being responsive to said local processor and a predetermined character screen command for generating a respective character display screen viewable on an associated display device;

locating means, operable when the first memory area has no vacant space for storing a newly accessed data item, for locating a data item in said first memory area for deletion according to criteria related to the data items which includes locating one data item wherein the preassigned relative priority of the located data item is lower than the preassigned relative priority of at least one of the other data items stored in the first memory area, the criteria further including tie-breaking criteria to select one data item when more than one data item is located having preassigned relative priorities lower than the preassigned relative priority of the at least one of the other data items; and deleting means responsive to said locating means for deleting the data item located by the locating means to create space in the first memory area for the newly accessed data item.

9. The system of claim 8 wherein said memory means further comprises a second memory area for storing a channel map containing a plurality of channel items, one of the channel items associating the predetermined keyboard key and the predetermined character screen command with a respective system feature, the predetermined character screen command being accessed by said local processor in response to actuation of the predetermined keyboard key for generating the respective character display screen.

10. The system of claim 8 wherein each of the character screen commands has a preassigned feature number corresponding to a respective system feature.

11. The system of claim 10 wherein while said first memory area is full and said local processor processes the activated system feature, said locating means locates a data item in said first memory area for deletion, the located data item being one of the character screen commands having a preassigned feature number different from the preassigned feature number of the character screen command corresponding to the activated system feature.

12. The system of claim 10 wherein:

said character screen generator, responsive to said local processor and the predetermined character screen command as a first character screen command, generates the respective character display screen as a first character display screen requesting a keyboard response; and said first character screen command includes a pointer specifying a second character screen command to be accessed by the local processor in response to a response to the requested keyboard response.

13. The system of claim 12 wherein:

the data items further include at least one non-character screen command; and while the preassigned feature number of said first character screen command corresponds to the activated system feature and no space is available in said first memory area for storing the newly accessed data item and the preassigned feature number of each of the character screen commands stored in said first memory area equals the preassigned feature number of said first character screen command, said locating means locates a data item in said first memory area, the located data item being a non-character screen command.

14. The system of claim 10 wherein:

a cannibal bit is associated with each character screen command;

when no space is available in said first memory area for storing the newly accessed data item and the newly accessed data item is a new character screen command having a cannibal bit in a first state, one of the character screen commands in said first memory area having a preassigned feature number corresponding to the activated system feature is deletable; and when no space is available in said first memory area for storing the newly accessed data item and the newly accessed data item is the new character screen command having the cannibal bit in a second state, each of the character screen commands in said first memory area having a preassigned feature number corresponding to the activated system feature is undeletable.

15. In a two-way interactive system comprising a host data processor, a central data store controlled by the host data processor for storing a central data base, said central data base comprising a plurality of data items, each of the data items having a relative priority preassigned within the central data base, and at least one local terminal subsystem connectable to the host data processor for accessing data items stored in the central data base, each of said at least one local terminal subsystem comprising a local processor for controlling access to the host data processor and memory means controlled by the local processor comprising a first memory area for storing data items accessed from the central data base, a method for controlling the storage of data items in said first memory area comprising steps of:

determining whether said first memory area contains vacant space for storing a newly accessed data item accessed from said central data base;

storing said newly accessed data item in said first memory are when vacant space exists in the first memory area; and when vacant space does not exist, locating a data item in said first memory area for deletion, the preassigned relative priority of the located data item being lower than the preassigned relative priority of at least one of the other data items stored in the first memory area, tie-breaking criteria being used to select one data item when more than one data item is located having preassigned relative priorities lower than the preassigned relative priority of the at least one of the other data items; and replacing the located data item with the newly accessed data item when no vacant space exists in the first memory area.

16. The method for controlling storage of data items according to claim 15, wherein the memory means further comprises a second memory area, the method further comprising a step of storing a plurality of directory entries, each directory entry in the second memory area corresponding to one data item stored in the first memory area for the corresponding data item, the directory entries being stored as a priority list in the second memory area in a sorted order according to the relative priority of the data items.

17. The method for controlling storage of data items according to claim 16 further comprising a step of updating and sorting the directory entries whenever the contents of the first memory area are changed.

18. The method for controlling storeage of data items according to claim 16 wherein the step of locating includes accessing the second memory area for locating the data item to be deleted.

19. The method for controlling storage of data items according to claim 15, wherein the two-way interactive system is characterized by a plurality of system features and the local terminal further comprises a keyboard having a plurality of keys for inputting information to the local processor, the method further comprising a step of activating a system feature in response to actuation of a predetermined key of the keyboard.

20. A terminal for accessing data items stored in a central data base of a two-way interactive system, each data item having a relative priority preassigned within said central data base, the terminal comprising:
   a processor for controlling access to the plurality of data items stored in the central data base;
   memory means controlled by the processor and comprising a first memory area for storing data items accessed from the central data base;
   locating means, operable when the first memory area has no vacant space for storing a newly accessed data item, for locating a data item in the first memory area for deletion according to criteria related to the data items which includes locating one data item wherein the preassigned relative priority of the located data item is lower than the preassigned relative priority of at least one of the other data items stored in the first memory area, the criteria further including tie-breaking criteria to select one data item when more than one data item is located having preassigned relative priorities lower than the preassigned relative priority of the at least one of the other data items; and
   deleting means responsive to the locating means for deleting the data item located by the locating means to create space in the first memory area for the newly accessed data item.

21. The terminal of claim 20 wherein the memory means further ;comprises a second memory area for storing a plurality of directory entries, each directory entry corresponding to one of the data items stored in the first memory area and specifying a memory address in the first memory area for the corresponding data item, the directory entries being stored as a priority list in the second memory area in a sorted order according to the relative priority of the data items in the first memory area.

22. The terminal of claim 21 further comprising sorting means for updating and sorting the directory entries whenever the contents of the first memory area are changed.

23. The terminal of claim 21 wherein the locating means locates a data item to be deleted by accessing the second memory area.

24. The terminal of claim 20 further comprising a keyboard having a plurality of keys for inputting information to the processor.

25. The terminal of claim 24 wherein the two-way interactive system is characterized by a plurality of system features and the processor separately activates a system feature in response to actuation of a predetermined key of the keyboard.

26. The terminal of claim 20, wherein the preassigned relative priority of the newly accessed data item is lower than the preassigned relative priority of one of the other data items.

27. A terminal for accessing a plurality of data items stored in a central data base of a two-way interactive system characterized by a plurality of system features, each data item having a relative priority preassigned within said central data base, the terminal comprising:
   a processor for controlling access to the plurality of data items stored in the central data base;
   a keyboard having a plurality of keys for inputting information to the processor, the processor activating a system feature of the plurality of system features in response to actuation of a predetermined key of the keyboard;
   a character screen generator capable of generating a plurality of character display screens;
   memory means controlled by the processor and comprising a first memory area for storing data items accessed from the central data base, the data items stored in the first memory area including a plurality of character screen commands, the character screen generator being responsive to the processor and a predetermined character screen command for generating a respective character display screen viewable on an associated display device;
   locating means, operable when the first memory area has no vacant space for storing a newly accessed data item, for locating a data item in the first memory area for deletion according to criteria related to the data items which includes locating one data item wherein the preassigned relative priority of at least one of the other data items stored in the preassigned relative priority of at least one of the other data items stored in the first memory area, the criteria further including tie-breaking criteria to select one data item when more than one data item is located having preassigned relative priorities lower than the preassigned relative priority of the at least one of the other data items; and
   deleting means responsive to the locating means for deleting the data item located by the locating means to create space in the first memory area for the newly accessed item.

28. The terminal of claim 27 wherein the memory means further comprises a second memory area for storing a channel map containing a plurality of channel items, one of the channel items associating the predetermined keyboard key and the predetermined character screen command with a respective system feature, the predetermined character screen command being accessed by the processor in response to actuation of the predetermined keyboard key for generating the respective character display screen.

29. The terminal of claim 27 wherein each of the character screen commands has a preassigned feature number corresponding to a respective system feature.

30. The terminal of claim 29 wherein while the first memory area is full and the processor processes the activated system feature, the locating means locates a data item in the first memory area for deletion, the located data item being one of the character screen commands having a preassigned feature number different from the preassigned feature number of the character screen command corresponding to the activated system feature.

31. The terminal of claim 29 wherein:
the character screen generator, responsive to the processor and the predetermined character screen command as a first character screen command, generates the respective character display screen as a first character display screen requesting a keyboard response; and
the first character screen command includes a pointer specifying a second character screen command to be accessed by the processor in response to a response to the requested keyboard response.

32. The terminal of claim 31 wherein;
the data items further include at least one non-character screen command;
while the preassigned feature number of the first character screen command corresponds to the activated system feature and no space is available in the first memory area for storing the newly accessed data item and the preassigned feature number of each of the character screen commands stored in said first memory area equals the preassigned feature number of the first character screen command, the locating means locates a data item in the first memory area, the located data item being a non-character screen command.

33. The terminal of claim 29 wherein:
a cannibal bit is associated with each character screen command;
when no space is available in the first memory area for storing the newly accessed data item and the newly accessed data item is a new character screen command having a cannibal bit in a first state, one of the character screen commands in the first memory area having a preassigned feature number corresponding to the activated system feature is deletable; and
when no space is available in said first memory area for storing the newly accessed data item and the newly accessed data item is the new character screen command having the cannibal bit in a second state, each of the character screen commands in said first memory area having a preassigned feature number corresponding to the activated system feature is undeletable.

34. In a two-way interactive system characterized by a plurality of system features, the system comprising a host data processor, a central data store controlled by the host data processor for storing a central data base, said central data base comprising a plurality of data items, the plurality of data items including a plurality of character screen commands, each of the data items having a relative priority preassigned within said central data base, and at least one local terminal subsystem connectable to the host data processor for accessing data items stored in the central data base, each of the at least one local terminal subsystem comprising a local processor for controlling access to the host data processor, a character screen generator capable of generating a plurality of character display screens, a keyboard having a plurality of keys for inputting information to the local processor and memory means controlled by the local processor comprising a first memory area for storing data items accessed from the central data base, a method for controlling the storage of data items in said first memory area comprising steps of:
determining whether said first memory means contains vacant space for storing a newly accessed data item accessed from said central data base;
activating a system feature of the plurality of system features in response to actuation of a predetermined key of the keyboard;
generating a character display screen viewable on an associated display device in response to a predetermined character screen command;
storing said newly accessed data item in said first memory area when vacant space exists in the first memory area; and
when vacant space does not exist, locating a data item in said first memory area for deletion, the preassigned relative priority of the located data item being lower than the preassigned relative priority of at least one of the other data items stored in the first memory area, tie-breaking criteria being used to select one data item when more than one data item is located having preassigned relative priorities lower than the preassigned relative priority of the at least one of the other data items; and
replacing the located data item with the newly accessed data item when no vacant space exists in the first memory area.

35. The method for controlling storage of data items according to claim 34, wherein the memory means further includes a second memory area, the method further comprising a step of storing a channel map in the second memory area, the channel map containing a plurality of channel items, one of the channel items associating the predetermined keyboard key and the predetermined character screen command with a respective system feature.

36. The method for controlling storage of data items according to claim 34, wherein each of the character screen commands has a preassigned feature number corresponding to a respective system feature, and the step of locating a data item in the first memory area for deletion includes locating a data item which is a character screen command having a preassigned feature number different from the preassigned feature number of the character screen command corresponding to the activated system feature when the newly accessed data item is accessed from the central data base while the first memory area is full.

37. The method for controlling storage of data items according to claim 36, wherein the step of generating includes:
generating a first character display screen in response to the predetermined character screen command as a first character screen command requesting a keyboard response, the first character screen command including a pointer specifying a second character screen command; and
accessing the second character screen command in response to a response to the requested keyboard response.

38. The method for controlling storage of data items according to claim 37 wherein the data items further include at least one non-character screen command and the step of locating a data item in the first memory area for deletion includes locating a non-character screen command when the preassigned feature number of each of the character screen commands stored in the first memory area equals the preassigned feature number of the first character screen command while no space is available in the first memory area for storing the newly accessed data item.

39. The method for controlling storage of data items according to claim 36, wherein a cannibal bit is associated with each character screen command, and the step of locating includes the steps of:
   identifying as deletable one of the character screen commands in said first memory area having a preassigned feature number corresponding to the activated system feature when the newly accessed data item is a new character screen command having a cannibal bit in a first state and the first memory area is full; and
   identifying as undeletable each of the character screen commands in said first memory area having a preassigned feature number corresponding to the activated system feature when the newly accessed data item is the new character screen command having the cannibal bit in a second state and the first memory area is full.

40. A two-way interactive system comprising:
   a host data processor;
   a central data store controlled by the host data processor for storing a central data base, said central data base comprising a plurality of data items, each of said data items having a relative priority preassigned within said central data base; and
   at least one local terminal subsystem connectable to the host data processor for accessing data items stored in the central data base, each of said at least one local terminal subsystem comprising:
   a local processor for controlling access to the host data processor;
   a character screen generator;
   memory means controlled by the local processor and comprising a first memory area for storing data items accessed from the central data base, the data items stored in the first memory area including a plurality of character screen commands, said character screen generator being responsive to said local processor and a character screen command for generating a character display screen viewable on an associated display device;
   locating means, operable when the first memory area has no vacant space for storing a newly accessed data item, for locating a data item in said first memory area for deletion according to criteria related to the data items which includes locating one data item wherein the preassigned relative priority of the located data item is lower than the preassigned relative priority of each of the other data items stored in the first memory area, the criteria further including tie-breaking criteria to select one data item when more than one data item is located having preassigned relative priorities lower than the preassigned relative priority of the at least one of the other data items; and
   deleting means responsive to said locating means for deleting the data item located by the locating means to create space in the first memory area for the newly accessed data item.

41. A terminal for accessing data items stored in a central data base of a two-way interactive system, each data item having a relative priority preassigned within said central data base, the terminal comprising:
   a processor for controlling access to the plurality of data items stored in the central data base;
   a character screen generator;
   memory means controlled by the processor and comprising a first memory area for storing data items accessed from the central data base, the data items stored in the first memory area including a plurality of character screen commands, said character screen generator being responsive to said processor and a character screen command for generating a character display screen viewable on an associated display device;
   locating means, operable when the first memory area has no vacant space for storing a newly accessed data item, for locating a data item in the first memory area for deletion according to criteria related to the data items which includes locating one data item wherein the preassigned relative priority of the located data item is lower than the preassigned relative priority of each of the other data items stored in the first memory area, the criteria further including tie-breaking criteria to select one data item when more than one data item is located having preassigned relative priorities lower than the preassigned relative priority of the at least one of the other data items; and
   deleting means responsive to the locating means for deleting the data item located by the locating means to create space in the first memory area for the newly accessed data item.

42. In a two-way interactive terminal system comprising a host data processor, a central data store controlled by the host data processor for storing a central data base, said central data base comprising a plurality of data items, each of the data items having a relative priority preassigned within said central data base, and at least one local terminal subsystem connectable to the host data processor for accessing data items stored in the central data base, each of said at least one local terminal subsystem comprising a local processor for controlling access to the host data processor, a character screen generator and memory means controlled by the local processor comprising a first memory area for storing data items accessed from the central data base, a method for controlling the storage of data items in said first memory area comprising steps of:
   determining whether said first memory area contains vacant space for storing a newly accessed data item accessed from said central data base;
   storing said newly accessed data item in said first memory area when vacant space exists in the first memory area; and
   when vacant space does not exist, locating a data item in said first memory area for deletion, the preassigned relative priority of the located data item being lower than the preassigned relative priority of each of the other data items stored in the first memory area, tie-breaking criteria being used to select one data item when more than one data item is located having preassigned relative priorities lower than the preassigned relative priority of the at least one of the other data items;
   replacing the located data item with the newly accessed data item when no vacant space exists in the first memory area; and
   generating a character display screen viewable on an associated display device in response to a character screen command.

* * * * *